United States Patent [19]

Ishii

[11] Patent Number: 4,634,223

[45] Date of Patent: Jan. 6, 1987

[54] PRISM WITH NO DETRIMENTAL INTERNAL REFLECTION

[75] Inventor: Toshio Ishii, Tokyo, Japan

[73] Assignee: Fuji Photo Film Co., Ltd., Kanagawa, Japan

[21] Appl. No.: 741,823

[22] Filed: Jun. 6, 1985

[30] Foreign Application Priority Data

Jun. 6, 1984 [JP] Japan .................. 59-114434

[51] Int. Cl.$^4$ .................................................. G02B 5/04
[52] U.S. Cl. .................. 350/276 SL; 350/286
[58] Field of Search ............ 350/276 R, 276 SL, 286, 350/287, 167, 321, 319

[56] References Cited

U.S. PATENT DOCUMENTS

| Re. 19,070 | 2/1934 | Chvetien | 350/167 |
|---|---|---|---|
| 2,773,411 | 12/1956 | Schwede | 350/276 SL |
| 3,603,670 | 9/1971 | Kim | 350/276 R |
| 3,648,056 | 3/1972 | Buttweile et al. | 350/276 SL |
| 3,984,157 | 10/1976 | LeVantine | 350/276 SL |
| 4,093,354 | 6/1978 | Leeb | 350/286 |
| 4,165,920 | 8/1979 | Brown | 350/276 R |

FOREIGN PATENT DOCUMENTS

| 281783 | 3/1966 | Australia | 350/276 R |
|---|---|---|---|
| 416509 | 9/1934 | United Kingdom | 350/286 |

Primary Examiner—Jon W. Henry
Attorney, Agent, or Firm—Young & Thompson

[57] ABSTRACT

A prism partly of a solid glass block enclosed with inoperative planes is provided on the inoperative planes with transparent members each of which comprises a light transmission part and a light attenuation part having a great number of either superfine prismatic protuberances or small acute indentations formed over the whole outer surface thereof. The transparent member has a refractive index of $n_1$ which satisfies the following condition:

$$n_1 \geq n_0 - 0.03$$

wherein $n_0$ is the refractive index of the prism. A ray of light incident upon the polished surface of the inoperative plane at an angle less than a critical angle passes the through transmission part and then is gradually attenuated as it is repeatedly reflected by the internal surfaces of the prismatic protuberance.

4 Claims, 5 Drawing Figures

FIG. 3
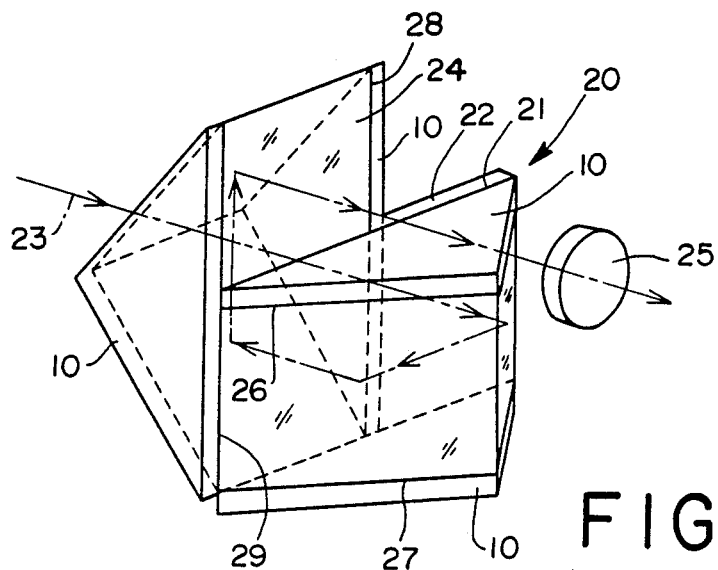
FIG. 4
FIG. 5
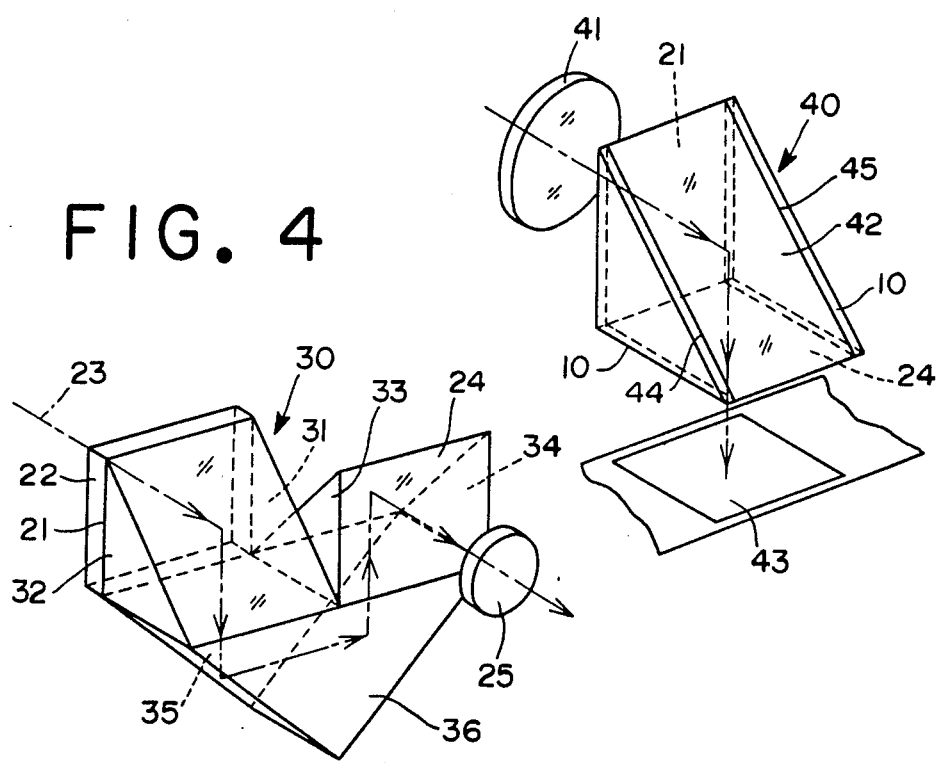

PRISM WITH NO DETRIMENTAL INTERNAL REFLECTION

BACKGROUND OF THE INVENTION

The present invention relates to a prism, widely usable with various precision optical instruments, in which provision is made to prevent detrimental internal reflection from any inoperative plane partially enclosing the prism.

Various types of prisms have been widely used with optical instruments to modify or deflect the path of light by reflection. Such prisms are solid blocks of transparent material having operational planes, such as light entry and light exit surfaces and internally reflective surfaces, and inoperative planes. The inoperative planes are not intended to serve as reflection surfaces, and hence there must be no light incident thereon.

But despite this intention, the inoperative planes, in actuality, are obliged to receive some incident rays of light because they must be near the path of light in order to make the prism smaller and lighter in weight. The rays of light incident upon the inoperative planes are internally reflected thereby and then travel as stray light, in some cases with repeating internal reflections, through the prism and the associated optical system. Such stray light is considered to be one of the factors by which ghosts and flares are produced on the image-forming plane of the optical system.

For the purpose of avoiding these detrimental internal reflections, it has been a usual practice to make the inoperative plane as an antireflection surface by rough-grinding it and then applying blacking thereto so as to absorb the rays of light incident thereupon. However, the recent improvement in the photosensitivity of photosensitive materials, photodetecting elements and the like renders even this measure insufficient.

OBJECTS OF THE INVENTION

Accordingly, an essential object of the present invention is to provide a prism in which detrimental internal reflections from its inoperative planes is markedly reduced.

Another object of the present invention is to provide a prism which does not require finishing its inoperative planes as rough surfaces.

A further object of the present invention is to provide a prism whose manufacturing cost is acceptable despite the prism having no detrimental internal reflection.

For accomplishing these and other objects, according to the present invention, a prism is provided on its inoperative planes with transparent members serving as light attenuation means each of which comprises a transmission part and an attenuation part, both of these parts being made of either glass or plastics. The attenuation means has a refractive index $n_1$ which satisfies the following condition:

$$n_1 \geq n_0 - 0.03$$

wherein: $n_0$ is the refractive index of the glass material of the prism.

The attenuation part comprises a number of superfine prismatic protuberances having a saw-toothed cross section as a whole and serves to gradually attenuate the rays of light entering thereinto by repeated internal reflections. Alternatively, the attenuation part can achieve the same results by replacing the superfine prismatic protuberances with acute indentations uniformly distributed on its surface.

By the provision of the transparent member to prevent detrimental internal reflection as mentioned above, a prism capable of markedly reducing the internal reflection from its inoperative planes as produced.

In addition, the attenuation part with a number of superfine prismatic protuberances can be molded integrally with the transmission part, resulting in easy and inexpensive production.

BRIEF DESCRIPTION OF THE DRAWINGS

These and other features and advantages of the invention will be described in more detail in the following, by way of example, reference being had to the accompanying drawings, in which:

FIG. 3 is a perspective view showing the second embodiment of the present invention;

FIG. 4 is a perspective view showing the third embodiment of the present invention; and FIG. 5 is a perspective view showing the fourth embodiment of the present invention.

DETAILED DESCRIPTION OF THE INVENTION

Figure 1:
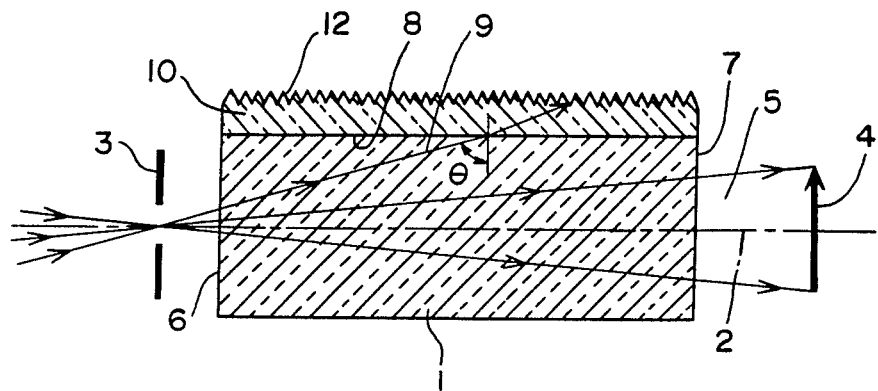
FIG. 1 is a schematic illustration showing the general constitution of the first embodiment of the present invention in a prism block.
Figure 2:
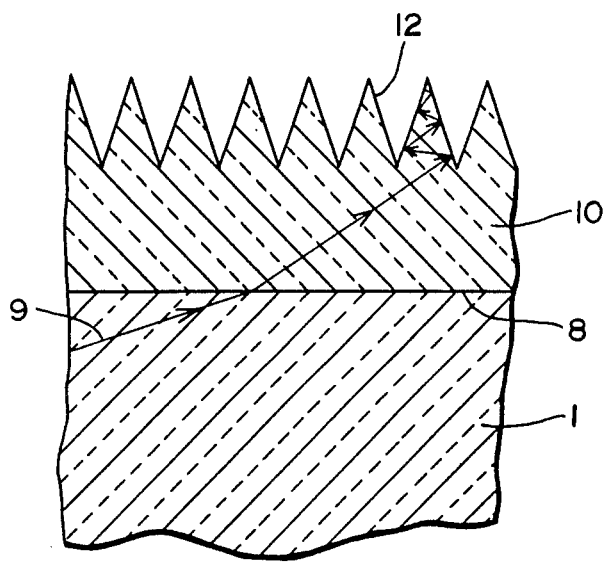
FIG. 2 is an enlarged fragmentary view of FIG. 1.

Referring now to FIGS. 1 and 2, there is shown a prism 1 in the form of a solid glass block of, for example, Boron-Kron 7 (BK7) which has a refractive index $n_0 = 1.516$. The prism 1 is disposed in an image-forming optical system (not shown) which has its optical axis designated by the reference numeral 2. Image-forming rays 5 of light are directed to a light entry surface 6 of the prism 1 through a diaphragm 3 and emerge from a light exit surface 7 for forming an image in an image plane 4. A ray 9 of light, which represents a part of the rays of light that do not contribute to image forming, impinges on an inoperative plane 8 of the prism 1.

As shown in FIG. 2, a transparent member 10 in the form of a plate of acrylic resin which has a refractive index $n_1 = 1.491$ is cemented to the inoperative plane 8 with, for example, a balsam having a refractive index equal to that of the prism 1. The transparent member 10 comprises a light transmission part and light attenuation part 12 having a great number of superfine prismatic protuberances with a saw-toothed configuration in cross section, which are integrally molded. It is possible to apply blacking to the surface of light attenuation part 12.

As is well known from Snell's law, almost all of the rays of light incident upon the polished surface of the inoperative plane 8 at an angle less than the critical angle of 79.58° (which can be calculated from the refraction indexes $n_0$ and $n_1$) are transmitted through the transmission part of the transparent member 10 and then directed to the prismatic protuberances of the attenuation part 12. The rays of light entering one of the prismatic protuberances are gradually attenuated by being repeatedly reflected by the internal surfaces thereof, as shown in detail in FIG. 2. Therefore, the rays of light entering the attenuation part 12 never re-enter the prism 1 at all and produce no ghosts or flares.

It should be noted that acrylic resin of the transparent member 10 can be replaced with another material having a refractive index $n_1$ greater than the refractive index $n_0$ of the prism 1 in order to transmit totally the rays of light incident upon the inoperative plane 8 to the attenuation part 12. In short, any transparent member satisfying the above-mentioned condition ($n_1 \geq n_0 - 0.03$) can be used with good results in comparison to conventional means.

The configuration of the attenuation part can be modified while achieving the same results by replacing the superfine prismatic protuberances with fine acute indentations uniformly distributed over the whole surface thereof. In addition, the attenuation part may be coated with an opaque material in order to make its outer surface flat for the purpose of handling it with ease and safety.

FIG. 3 shows another embodiment of the present invention which is applied to a prism 20 known as a Poroprism type-1 which is widely used in the viewfinder optical systems of cameras or other optical instruments. The prism 20 is a solid block of BK7 glass and has a light entry surface 21 provided with a focusing screen 22 on which an image is formed. The image forming rays of light entering the prism 20 emerge from its light exit surface 24 after traveling along its optical axis and being reflected four times and then are observed through an eyepiece 25. The prism 20 is enclosed by six operative planes, that is, four reflective surfaces finished to optically smooth surfaces in addition to the entry surface 21 and the exit surface 24. The prism 20 is also enclosed by four sides or inoperative planes 26 to 29 which are each provided with a transparent member 10 of a material such as acrylic resin having a refractive index $n_1 = 1.491$ which is the same as shown in FIG. 1. It is of course again true that the transparent member 10 comprises a light transmission part and a light attenuation part 12 with a great number of superfine prismatic protuberances similar to those of FIG. 1. Therefore, there is almost no internal reflection from the inoperative planes 26 to 29.

FIG. 4 shows a further embodiment in which the present invention is applied to a prism 30 known as a Poroprism type-2. In this figure, the parts similar to those of FIG. 3 are designated by the same reference numerals. The prism 30, which is again a solid block of BK7 glass, is enclosed by four operative planes and six inoperative planes 31 through 36. To the respective inoperative planes 31 through 36 the same transparent members 10 are shown in FIG. 1 are cemented but in FIG. 4, which are omitted for simplicity.

FIG. 5 shows a still further embodiment in which the present invention is applied to a prism 40 which is again a solid block of BK7 glass. The prism 40, which is a right-angled triangular prism, causes the image-forming rays of light directed upon an entry surface 21 thereof by a taking lens 41, to turn at a right angle by internal reflection from a reflective surface 42 and then to proceed to a film plane 43 through an exit surface 24. In this embodiment, the prism 40 also has inoperative sides or planes 44, 45 with the transparent members 10 shown in FIG. 1 cemented thereto for effective light attenuation.

Although the present invention has been described by way of preferred embodiments thereof with reference to the accompanying drawings, it is to be noted that the possibility of making various changes and modifications will be apparent to those skilled in the art. For example, the solid glass block or prism may be of any material such as Barium Kron 4, Silicate Kron 4, Lanthanum Kron 13 and the like. In addition, the present invention is applicable to prisms having various configurations other from those shown in the illustrated embodiments. Therefore, unless otherwise such changes and modifications depart the scope of the present invention, they should be construed as being included therein.

What is claimed is:

1. A transparent prism enclosed by operative planes and inoperative planes, said prism comprising:
   a solid block forming said prism and having a refractive index of $n_0$; and
   transparent members having a refractive index of $n_1$ which are cemented to said inoperative planes;
   each of said transparent members having a light attenuation part on its outer side and satisfying the following condition:

$$n_1 \geq n_0 - 0.03,$$

said light attenuation part having a great number of either superfine prismatic protuberances or fine acute indentations formed over the whole outer surface thereof, said outer surface being made flat by being coated with a light opaque material.

2. A prism as defined in claim 1, in which said transparent member is integrally molded.

3. A transparent prism enclosed by operative planes and inoperative planes, said prism comprising:
   a solid block forming said prism;
   transparent members having a higher index of refraction than said solid block, said transparent members being cemented to said inoperative planes;
   each of said transparent members having a light attenuation part on its outer side.

4. A transparent prism enclosed by operative planes and inoperative planes, said prism comprising:
   a solid block forming said prism and having a refractive index of $n_0$; and
   transparent members having a refractive index of $n_1$ which are cemented to said inoperative planes;
   each of said transparent members having a light attenuation part on its outer side and satisfying the following condition:

$$n_1 \geq n_0 - 0.03,$$

said solid block being glass and said transparent members being acrylic resin.

* * * * *